Nov. 12, 1929.    G. F. JONES    1,735,116
AUTOMATIC STATION
Filed May 19, 1928
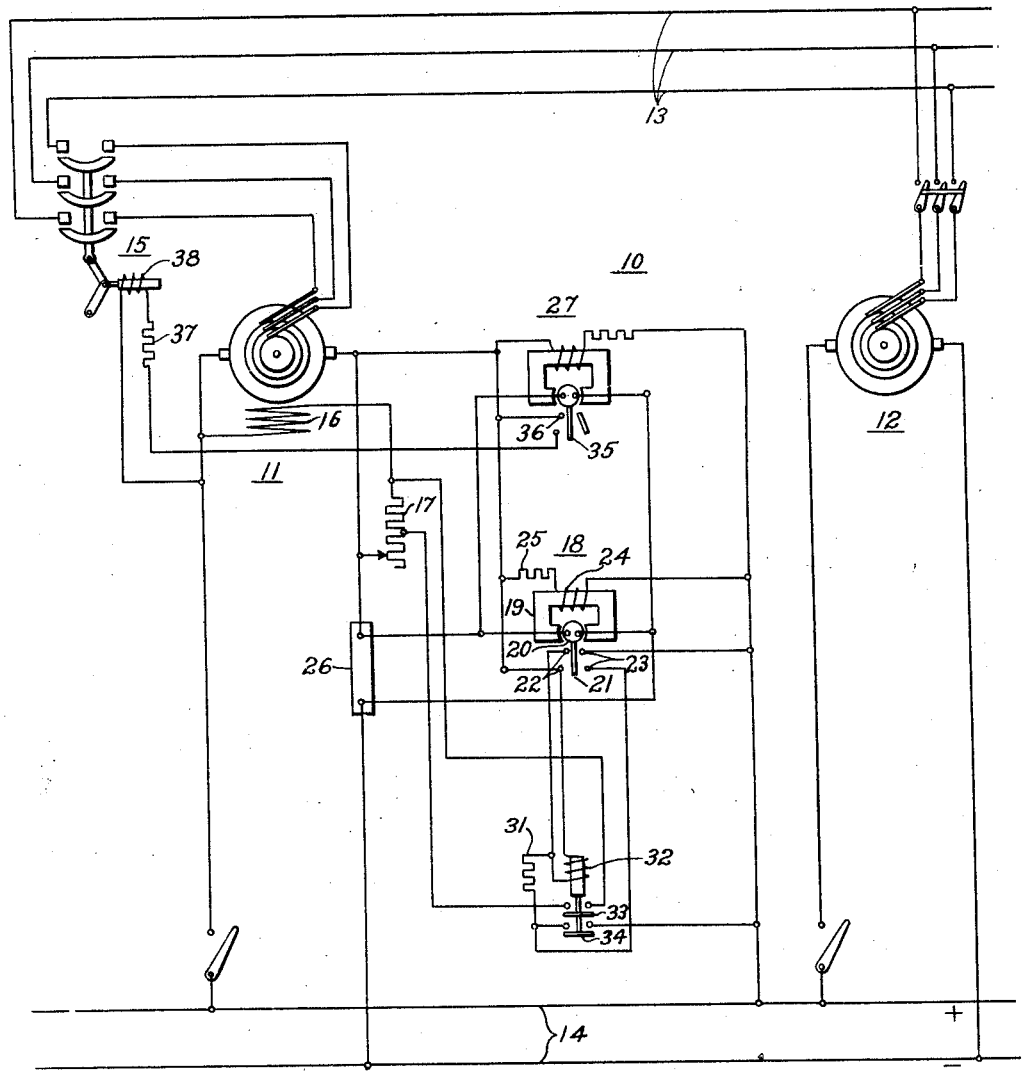
INVENTOR
Gordon F. Jones.
BY
ATTORNEY Patented Nov. 12, 1929

1,735,116

UNITED STATES PATENT OFFICE

GORDON F. JONES, OF IRWIN, PENNSYLVANIA, ASSIGNOR TO WESTINGHOUSE ELECTRIC & MANUFACTURING COMPANY, A CORPORATION OF PENNSYLVANIA

AUTOMATIC STATION

Application filed May 19, 1928. Serial No. 279,183.

This invention pertains to automatic translating stations and, more particularly, to automatic stations in which are located a plurality of translating devices which are adapted to be connected successively to a load circuit, to supply energy thereto.

When a translating station contains two or more translating devices, there are times when one device will have been running for a sufficient length of time to reach its normal operating temperature, while the other unit or units have been idle. If an idle unit is then started, with its field rheostat at a fixed setting, corresponding to that of the rheostat of the hot unit, the resistance of the shunt field circuit of the cold machine will be much less than that of the hot machine because of its lower temperature and, therefore, the excitation of the cold unit will be greater than that of the hot unit. The terminal voltages of the two machines will have the same proportion as their excitations and thus the voltage of the cold machine will be higher than that of the hot machine.

If the hot and cold units are paralleled, under these conditions of unequal voltages, the cold machine will send current through the hot machine which will, thereupon, run as a motor, unless the load on the station is sufficient to cause the voltage of the cold machine to fall until it is equal to that of the hot machine. If reverse-current protection is provided, the hot machine will be tripped off the line when the current circulating between the hot and cold units is equal to, or greater than, that for which the reverse-current relay is set.

In manually-operated stations, the field rheostat of the cold machine may be manipulated to equalize its voltage with that of the hot machine, but since there can be no manual rheostat adjustment in automatic stations, it is the purpose of the present invention to accomplish the necessary field-rheostat adjustment automatically.

The principal object of this invention, therefore, is to provide means whereby hot and cold units in an automatic station may be paralleled at times of light load without the occurrence of an excessive circulating current.

A further object of this invention is to provide automatic means for controlling the resistance of the field circuit of a hot machine, whereby its terminal voltage may be equalized with that of a cold machine to which it is connected in parallel.

In accordance with my invention, I make use of a relay responsive to the magnitude and direction of the current circulating between two translating devices connected in parallel, so that, when the circulating current attains a predetermined value in a given direction, means for adjusting the resistance of the field circuit of the hot machine will be actuated to cause the terminal voltage of the hot machine to be equalized with that of the cold machine.

A complete understanding of my invention may be best obtained by a consideration of the accompanying drawing, in connection with the following description.

The single figure of the drawing is a diagram of the circuits and apparatus necessary to a practical embodiment of the system constituting my invention.

Referring particularly to the drawing, an automatic station 10 comprises the translating devices 11 and 12 which are adapted to be supplied with energy from the circuit 13 and to deliver energy to the circuit 14. The translating devices 11 and 12 may be motor-generator sets, rotary converters, or other equivalent devices, but, for convenience in illustration, are assumed to be rotary converters.

Any suitable means may be provided for controlling the starting of the converters 11 and 12. Such means constitute no part of the present invention, are well known in the art, and are, therefore, not described in detail.

I have shown merely a circuit breaker 15 for connecting the converters 11 and 12 to the circuit 13. Additional control equipment may be employed if desired.

For the purpose of this description, it is assumed that the converter 11 has been running a sufficient length of time to attain its operating temperature and that it is desired to connect the converter 12 in parallel therewith. If the converter 12 has been out of service for a period of time long enough for the windings to attain the temperature of the surrounding atmosphere, it will be obvious that the resistance of its field winding will be less than the resistance of the field winding of the converter 11. If the setting of the field rheostat 17 of the converter 11 is fixed, it will also be obvious that the current in the field circuit of the converter 12 will be greater than the field current of the converter 11 and that the terminal voltages of the two machines will differ in the same proportion.

If the station load is comparatively light, so that there is no tendency for the voltage of the cold machine 12 to be reduced to equal that of the hot machine 11, the former will, because of its higher terminal voltage, tend to send current through the latter and run it as a motor. This condition is undesirable, and it is the purpose of my invention to provide means for avoiding it.

The means which I employ to perform this function includes a relay 18 of the D'Arsonval-galvanometer type, comprising a magnetic circuit 19, which may be that of a permanent magnet or an electric magnet, and a moving coil 20 carrying a suitable contact member 21 adapted to engage the fixed contact members 22 or the fixed contact members 23, depending upon the direction of current in the moving coil. The magnetic circuit of the relay 18 is illustrated as that of an electromagnet, the winding 24 of which is connected in series with a protective resistance 25, across the circuit 14. The moving coil 20 of the relay 18 is connected across a non-inductive shunt 26 in the circuit of converter 11.

A relay 27, which is similar to that shown at 18, except that it is provided with only one set of fixed contact members, is also a part of the system of my invention and its function is to effect the disconnection of the converter 11 from the circuit 13 when the circulating current through the converter reaches a predetermined value.

The other elements involved in the system of my invention will be described and their functions specified in the course of the following description of operation.

Let it be assumed that the converter 11 has been running for a sufficient length of time to attain its operating temperature, and that the converter 12 has just been started and is, therefore, comparaively cool. The switches connecting the converters to the circuits 13 and 14 may be closed automatically by means well known in the automatic station art.

As already explained, the resistance of the field-winding circuit of the cold machine 12 will be less than that of the field-winding circuit of the hot machine 11, and, since the terminal voltage of the converter 12 is greater than that of the converter 11, unless the station load is sufficient to cause the voltage of the converter 12 to be reduced to that of the converter 11, the former will tend to send current through the latter to drive it as a motor.

The moving coil 20 of the relay 18 is so connected to the shunt 26 that, when the above described conditions exist, the contact member 21, which normally occupies a neutral position, will be actuated into engagement with the contact members 23. The engagement of the contact members 21 and 23 completes a circuit from the positive bus 14 through the contact members 21 and 23, a protective resistance 31 and the operating coil of an auxiliary relay 32 and thence to the negative bus.

The energization of the operating coil of the relay 32 causes it to close its two contact members 33 and 34. The closing of the contact member 34 completes a locking circuit in parallel with the contact members 23 so that the subsequent movement of the contact member 21 does not affect the energization of the operating coil of the relay 32.

The closing of the contact member 33 short-circuits a portion of the field rheostat 17 of the hot machine 11 so that its field current and, therefore, its terminal voltage, is increased.

This increase of the terminal voltage of the hot machine 11 tends to prevent the flow of circulating current as a result of the relatively high terminal voltage of the converter 12.

As the temperature of the converter 12 increases, because of the continued operation, the resistance of its field circuit will naturally increase, and the excitation and the terminal voltage will then be less than the excitation and terminal voltage of the converter 11, so that the converter 11 may tend to circulate current through the converter 12.

If the voltages of the converters are equal, they will, of course, both supply energy to the load connected to the circuit 14. In any case, when current flows from the converter 11 to the circuit 14, the direction of the current energizing the moving coil of the relay 18 will be in such direction as to cause the moving contact member 21 to engage the fixed contact members 22. The engagement of the contact members 21 and 22 short-circuits the operating coil of the relay 32 which, thereupon, opens its contact members 33 and 34 to remove the short-circuit from the rheostat 17 in the circuit of the field winding 16 of the converter 11, and to open the locking circuit for the relay 32.

If the removal of the short-circuit from the rheostat 17 decreases the terminal voltage of the converter 11 to such an extent that current is again supplied thereto from the converter 12, the above described operation will be repeated and the rheostat again short-circuited. Similarly, when the temperature of the converter 12 further increases, the short-circuit will be removed and this sequence of operations will be repeated until the temperature of the converter 12 increases so that the resistance of its field circuit is substantially the same as that of the field circuit of the converter 11.

As a means of protecting the converters against failure of the alternating-current supply source 13, the contact member 35 of the relay 27 may be adjusted to engage the contact members 36 when the reverse current flowing through the converter 11 exceeds its normal idling value. The engagement of the contact members 36 completes a circuit including a protective resistance 37 and a trip coil 38 and the power busses 14. The energization of the tripping coil 38 effects the opening of the circuit breaker 15 to disconnect the converter 11 from the circuit 13. The same circuit may be employed to control the operation of the circuit interrupter controlling the supply of alternating current to the converter 12.

It is to be noted that the contact members of the relay 18 should be so adjusted that they will be bridged when the reverse current attains a value considerably less than the normal idling reverse current which is required to trip the relay 27.

At all times, when the converter 11 is supplying energy to the load, the contacts 22 of the relay 18 will be bridged by the contact 21, and the relay 32 will be de-energized, so that the field circuit of the converter 11 includes the normal amount of resistance. Under these conditions, there will, obviously, be no need for temperature compensation, since the load on the station will be sufficient to cause the terminal voltages of the two converters to be equal.

It will be apparent to those skilled in the art that the system of my invention provides means for automatically compensating for the difference in the resistance of a hot generator or converter and that of a cold unit of similar design and characteristics.

Thus, it is possible to parallel two such units without the occurrence of an excessive circulating current and without manual adjustment of the field rheostats of the various translating devices.

It is to be distinctly understood that my invention may be extended to provide temperature compensation for any number of units in an automatic station, and that, although I have, for the sake of simplicity, shown a two-unit station only one unit of which is equipped with the system of my invention, in a practical embodiment thereof, each unit would be similarly equipped.

Since the system of my invention is obviously susceptible of changes and modifications, I do not intend to be limited to the exact embodiment enclosed except as necessitated by the scope of the appended claims.

I claim as my invention:

1. In an automatic station, means for controlling the voltage of a hot machine connected in parallel with a cold machine in accordance with the voltage of the latter, including a relay responsive to the direction of current flow between said machines and a resistance-shunting relay controlled thereby.

2. An automatic station comprising a plurality of translating devices adapted to be connected in parallel, means for controlling the voltage of one of said devices in accordance with the voltage of the other, including means responsive to the direction of the current circulating between said devices and a resistance-shunting relay controlled thereby.

3. Means for preventing the flow of excessive circulating current between hot and cold translating devices connected in parallel comprising means responsive to a predetermined value of said circulating current for controlling the voltage of one of said devices, whereby the said voltage is equalized with that of the other device.

4. A regulating system for so controlling the voltage of one of a plurality of translating devices in an automatic station as to prevent excessive circulating current when the devices are connected in parallel, including a relay responsive to a predetermined value of circulating current in a given direction for equalizing the voltages of said devices.

5. In an automatic station, a plurality of converters adapted to be connected in parallel, means for preventing the flow of excessive circulating current therebetween under light-load conditions comprising a relay responsive to the magnitude and direction of said circulating current for varying the resistance of the field circuit of one of said converters, whereby its voltage is made equal to that of the other converter.

6. The combination, in an automatic translating station, with a plurality of rotary converters, of means for equalizing the voltage of a hot converter with that of a cold converter, under light-load conditions, including a relay responsive to the magnitude and direction of the current circulating between said converters when they are connected in parallel, and means controlled by said relay for short-circuiting a portion of the field rheostat of the hot converter, whereby its excitation is increased to equalize its terminal voltage with that of the cold machine.

7. In an automatic station, a plurality of translating units having shunt-field windings, means for preventing the flow of excessive circulating current between hot and cold units connected in parallel, including a relay responsive to the magnitude and direction of said circulating current and a relay controlled thereby for varying the resistance of the field circuit of the hot unit to equalize its voltage with that of the cold unit.

In testimony whereof, I have hereunto subscribed my name this 17th day of May, 1928.

GORDON F. JONES.